(12) United States Patent
Liu et al.

(10) Patent No.: US 7,978,579 B1
(45) Date of Patent: Jul. 12, 2011

(54) HD DVD WOBBLE DETECTION CIRCUIT

(75) Inventors: Jingfeng Liu, Longmont, CO (US); Wooi-Kean Lee, Broomfield, CO (US)

(73) Assignee: Marvell International Ltd., Hamilton (BM)

( * ) Notice: Subject to any disclaimer, the term of this patent is extended or adjusted under 35 U.S.C. 154(b) by 783 days.

(21) Appl. No.: 11/856,595

(22) Filed: Sep. 17, 2007

Related U.S. Application Data

(60) Provisional application No. 60/826,031, filed on Sep. 18, 2006.

(51) Int. Cl.
G11B 20/10 (2006.01)

(52) U.S. Cl. .................................... 369/53.34

(58) Field of Classification Search .................. None
See application file for complete search history.

(56) References Cited

U.S. PATENT DOCUMENTS

| | | | | |
|---|---|---|---|---|
| 6,345,018 | B1 * | 2/2002 | Maegawa et al. | 369/44.13 |
| RE39,513 | E * | 3/2007 | Maegawa et al. | 369/44.13 |
| 7,400,561 | B2 * | 7/2008 | Serrano et al. | 369/47.28 |
| 2003/0099180 | A1 * | 5/2003 | Park et al. | 369/59.25 |
| 2005/0068866 | A1 * | 3/2005 | Serrano et al. | 369/47.28 |
| 2006/0077849 | A1 * | 4/2006 | Chen et al. | 369/59.17 |

OTHER PUBLICATIONS

ECMA International, "Data Interchange on 120 mm and 80 mm Optical Disk using + RW Format—Capacity: 4, 7 and 1, 46 Gbytes per Side", (Recording speed up to 4X), Rue du Rhône 114, CH-1204, Geneva, www.ecma-international.org Standard ECMA-337, 3rd Edition, Dec. 2005; pp. 1-143.

\* cited by examiner

*Primary Examiner* — Hoa T Nguyen
*Assistant Examiner* — Mark L Fischer

(57) ABSTRACT

In a circuit, a wobble detector detects a wobble signal from an optical recording medium and a synchronization signal based on the wobble signal and provides a wobble clock signal. A wobble signal phase imperfection detector responds to the wobble signal and detects and corrects a phase transition imperfection in the wobble signal. The imperfection detector integrates a first scaled wobble signal sample over a half period portion of the wobble clock signal; compares the first scaled wobble signal sample integrated over one period of the wobble clock signal to a variable threshold value; and based on the comparison, outputs either the half period integrated and scaled wobble sample or the first scaled wobble sample integrated over one period of the wobble clock signal. The imperfection detector further decodes the output to obtain wobble address period data. In one embodiment, the imperfection detector may include a half period integrator, a comparator, a selector, and a decoder to perform the indicated functions.

23 Claims, 7 Drawing Sheets

HD DVD WOBBLE DETECTION CIRCUIT

CROSS REFERENCE TO RELATED APPLICATIONS

The present application claims the benefit of U.S. provisional application Ser. No. 60/826,031, filed on Sep. 18, 2006, the disclosure of which is incorporated herein by reference in its entirety.

BACKGROUND OF THE INVENTION

1. Field of the Invention

This invention relates generally to storing data on an optical disc, and more particularly to a wobble detection circuit, including such a circuit for use in video disc recording media employing Binary Phase Shift Keying (BPSK).

2. Description of the Related Art

Certain optical disc standards, such as HD DVD and DVD+(R and RW), employ BPSK to encode address or location data in the form of bits 0 and 1 on a wobble of an optical disc. During mastering or recording of a disc, this addressing data may be stored as phase modulated data, which is known in the art as Address-in-Pregroove (ADIP). The wobble is a continuous sinusoidal deviation of a track from an average centerline. A wobble signal also may be read from the wobble by a recording drive to precisely rotate the disc according to the frequency of the wobble signal. Using the frequency of the wobble signal, a timing signal may be generated to be used when writing data to the disc. An exemplary embodiment of a disc using BPSK encoding may have data bit 0 represented by a wobble with a first phase (i.e., a normal phase) and data bit 1 represented by a wobble with a second phase 180 degrees apart from the first phase (i.e., an inverted phase). During the mastering process, phase change transitions from a wobble having a normal phase to a wobble having an inverted phase may not be perfect. The inverted phase may extend to its neighboring normal phase wobble or vice versa.

FIG. 1 illustrates an example of a phase change transition problem using a captured HD DVD wobble signal waveform. FIG. 1 shows a captured wobble signal 110 in relation to a wobble clock signal 105. Four arrows 115, 120, 125, 130 point to imperfect phase change transitions from a wobble signal with a normal phase to a wobble signal with an inverted phase. The imperfect phase transitions degrade the performance of wobble signal detection, thereby hampering detection of addressing or ADIP data stored on the wobble of the disc.

Therefore, it would be desirable to have an apparatus that can detect and correct phase transition imperfections associated with optical disc wobble, particularly optical discs storing signals using BPSK.

SUMMARY OF THE INVENTION

To address the stated need and fulfill other desired objectives, in accordance with one embodiment of the invention, a wobble detector may detect a wobble signal and may provide a wobble clock signal. A wobble signal phase imperfection detector may detect and correct a phase transition imperfection in the wobble signal. The imperfection detector may integrate a first scaled wobble signal sample over substantially a half period portion of the wobble clock signal; compare the first scaled wobble signal sample integrated over substantially one period of the wobble clock signal to a variable threshold value; and based on the comparison, output either the half period integrated and scaled wobble sample or the first scaled wobble sample integrated over one period of the wobble clock signal. The imperfection detector further may decode the output to obtain wobble address period data. In one embodiment, the imperfection detector may include a half-period integrator, a comparator, a selector, and a decoder to perform the indicated functions.

DETAILED DESCRIPTION OF EMBODIMENTS

Figure 1:
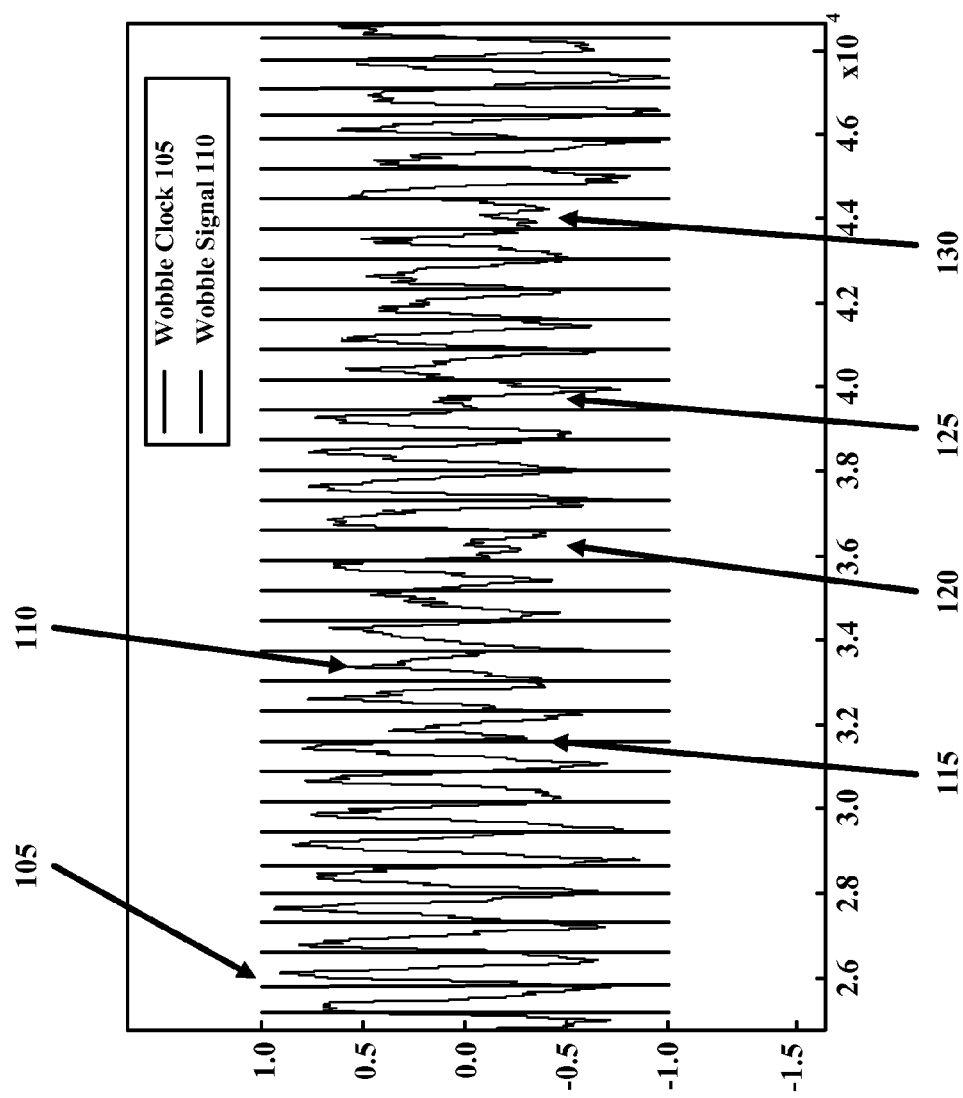
FIG. 1 illustrates a graph of a captured HD wobble waveform.
Figure 2:
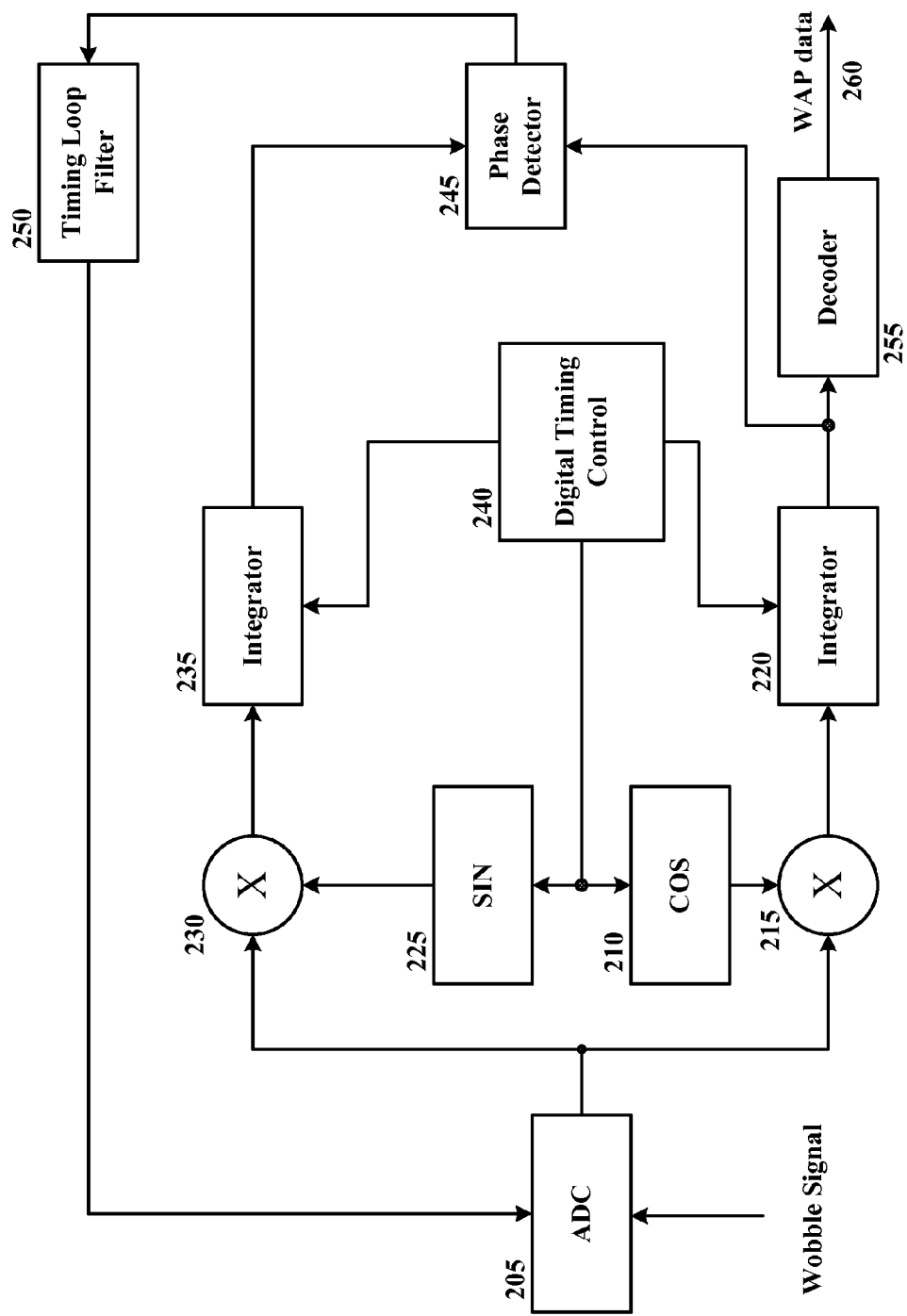
FIG. 2 illustrates a block diagram of one embodiment of a wobble demodulator.

FIG. 2 illustrates a block diagram of one embodiment of a wobble demodulator. An analog-to-digital (A/D) converter 205 may convert addressing data into digital samples using a filtered timing error signal provided by a timing loop filter 250 as a clock. The digital samples may be received and manipulated by two branches of the wobble demodulator. A first branch may include a first multiplier 215 and a first integrator 220. The first multiplier 215 may receive the digital sample from the (A/D) converter 205 and may multiply the sample by a first scaling factor. In this embodiment, the first scaling factor may be a cosine function 210 (an in-phase component). The scaled sample may be received by the first integrator 220, which may integrate the scaled sample over one period of a wobble clock signal. The resulted integrated sum may be output by the integrator 220. The wobble clock signal may be supplied to the first integrator 220 by a digital timing controller 240 which generates the wobble clock signal.

A second branch may include a second multiplier 230 and a second integrator 235. The second multiplier 230 may receive the digital sample from the A/D converter 205 and may multiply the sample by a second scaling factor. In this embodiment, the second scaling factor may be a sine function 225 (a quadrature component). The second scaled sample may be passed to the second integrator 235, which may integrate the second scaled sample over one period of the wobble clock signal. The integrator 235 may receive the wobble clock signal from the digital timing controller 240. Together, the two scaled and integrated samples may pass to a phase detector 245, which may generate phase information using the two samples. In one embodiment, the phase detector 245 may employ an arctangent function to generate the phase information. The phase information generated may be used as a timing error signal. This timing error signal may pass to the timing loop filter 250, which may filter the timing error signal. The resulting filtered timing error signal may serve as the clock for the A/D converter 205. The first scaled and integrated sample, output by the first integrator 220, may also pass to a decoder 255. The decoder 255 may decode wobble address period (WAP) data 260, otherwise known as physical addressing data, from the integrated sample and provide it to be used by the recording drive.

Figure 3:
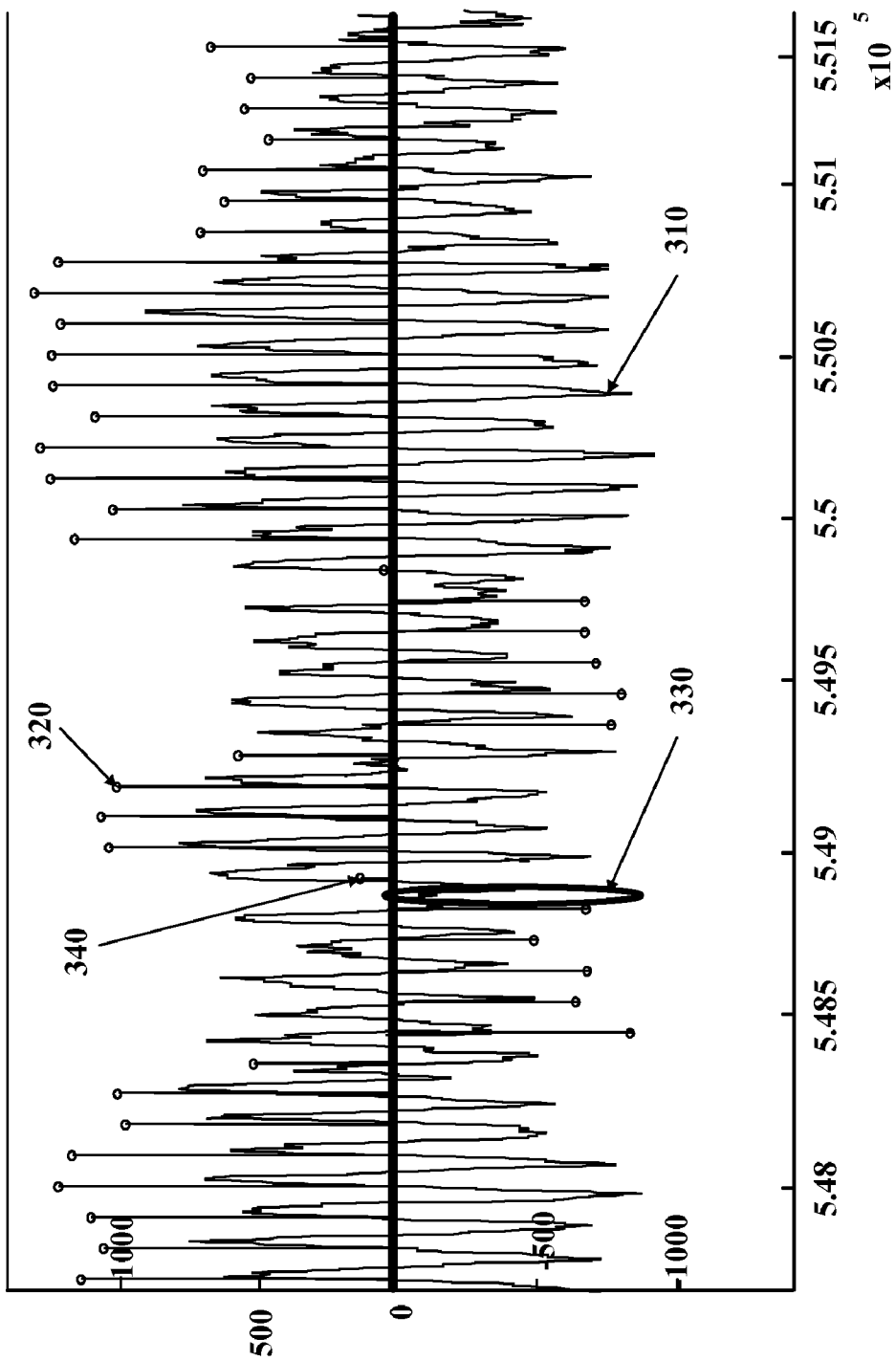
FIG. 3 is a graph illustrating phase transition imperfections suffered by the wobble demodulator of FIG. 2.

FIG. 3 is a graph illustrating phase transition imperfections suffered by the wobble demodulator of FIG. 2. The graph illustrates one embodiment of a wobble signal 310. The graph of the wobble signal 310 includes data points such as 320 which embody the output of the second integrator 235. A phase transition imperfection in the wobble signal 310 may be seen as the circled portion 330 of the wobble signal 310, in which the phase of a (n+1)st wobble sample extends into the nth wobble sample. This phase imperfection may cause the wobble demodulator to output an incorrect integrator output, as shown by the data point 340.

Figure 4:
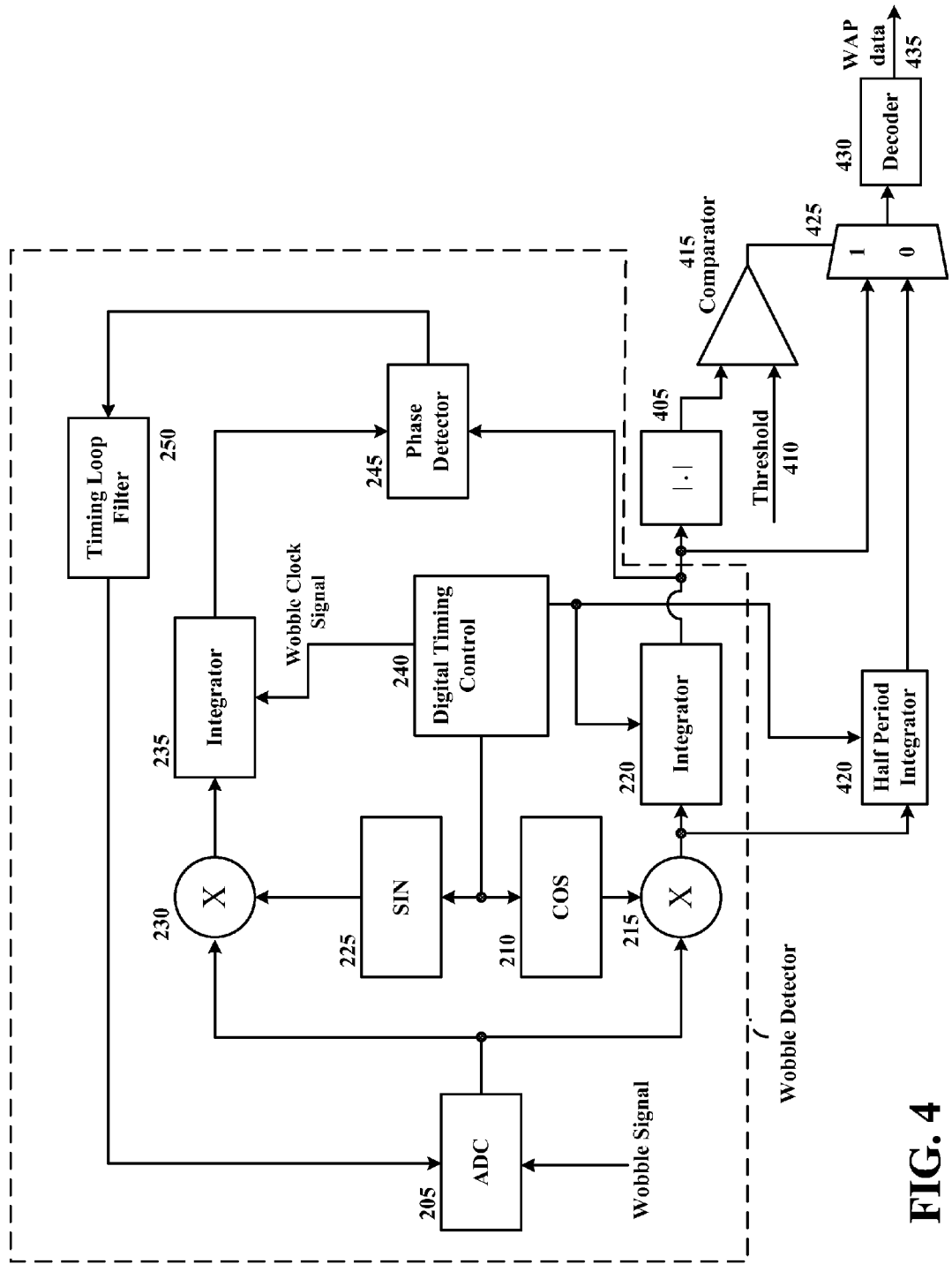
FIG. 4 illustrates a block diagram of one embodiment of a wobble demodulator with a circuit to correct a phase transition imperfection.

FIG. 4 is a block diagram illustrating one embodiment of a wobble demodulator with a circuit to correct a phase transition imperfection. The wobble demodulator may include many of the same components as found in the wobble demodulator illustrated by FIG. 2 and described in the corresponding paragraphs. These elements in FIG. 4 have the same reference numerals as in FIG. 2, for ease of reference. However, it should be understood that the inventive circuitry may be employed with other wobble demodulators, and that FIG. 4 is merely a non-limiting example.

In FIG. 4, the A/D converter 205 may provide digital wobble signal samples to a first and a second branch, each of which may have a multiplier and an integrator. The first multiplier 215 found in the first branch may multiply the sample by a first scaling factor 210, which in one embodiment, may be a cosine function (an in-phase component). The first integrator 120 may receive the first scaled sample and may integrate it over exactly one period of a wobble clock signal. The wobble clock signal may be generated and supplied by a digital timing controller 240.

The second multiplier 230 of the second branch may multiply the sample by a second scaling factor 225, which in one embodiment, may be a sine function (a quadrature component). The second integrator 235 may receive the second scaled sample and may integrate it exactly one period of the wobble clock signal, which may be supplied to the second integrator by the digital timing controller 240. The two scaled and integrated samples may pass to a phase detector 245 which may generate phase information using the samples. In one embodiment, the phase detector 245 may employ an arctangent function to generate the phase information. The phase information may serve as a timing error signal, which may pass to a timing loop filter 250. The timing loop filter 250 may smooth the timing error signal and provide the resulting filtered timing error signal to the A/D converter 205.

The phase transition imperfection detector circuit attached to the wobble demodulator may include an absolute value circuit 405, a comparator 415, a half-period integrator 420, a selector 425, and a decoder 430. The absolute value circuit 405 may calculate the absolute value of the output of the first integrator 220. The resulting numerical value of the integration result may be compared to a programmable threshold value 410 by a comparator 415. If the absolute value of the first scaled and integrated sample is greater than the programmable threshold value, then the selector 425 may select the first scaled and integrated sample. This selection of this sample may indicate that no phase transition imperfection problem exists with this particular sample. In one embodiment, the selector 425 may be a switch.

If the absolute value of the first scaled and integrated sample is less than the programmable threshold value, then a phase transition imperfection may exist for the particular sample. Generally, the phase transition imperfection may occur during the first half or the second half of the wobble clock signal period. As a result, a half-period integrator 420 may integrate the first scaled signal over the half of the wobble clock signal period which does not cause the phase transition imperfection (i.e., either the first half period or the second half period of the wobble clock signal). The choice of which half period to integrate the sample over may be made by the digital timing controller 240. The digital timing controller 240 may use an algorithm to determine whether to integrate the first scaled sample over the first half period or the second half period of the wobble clock signal. The half period integrator 420 may integrate the first scaled sample over the half period (i.e., first or second) chosen by the digital timing controller 240. The selector 425 may select the half period integrated result as its output, and the half period integrated result may then be decoded by a decoder 430 to obtain wobble address period data 435.

Figure 5:
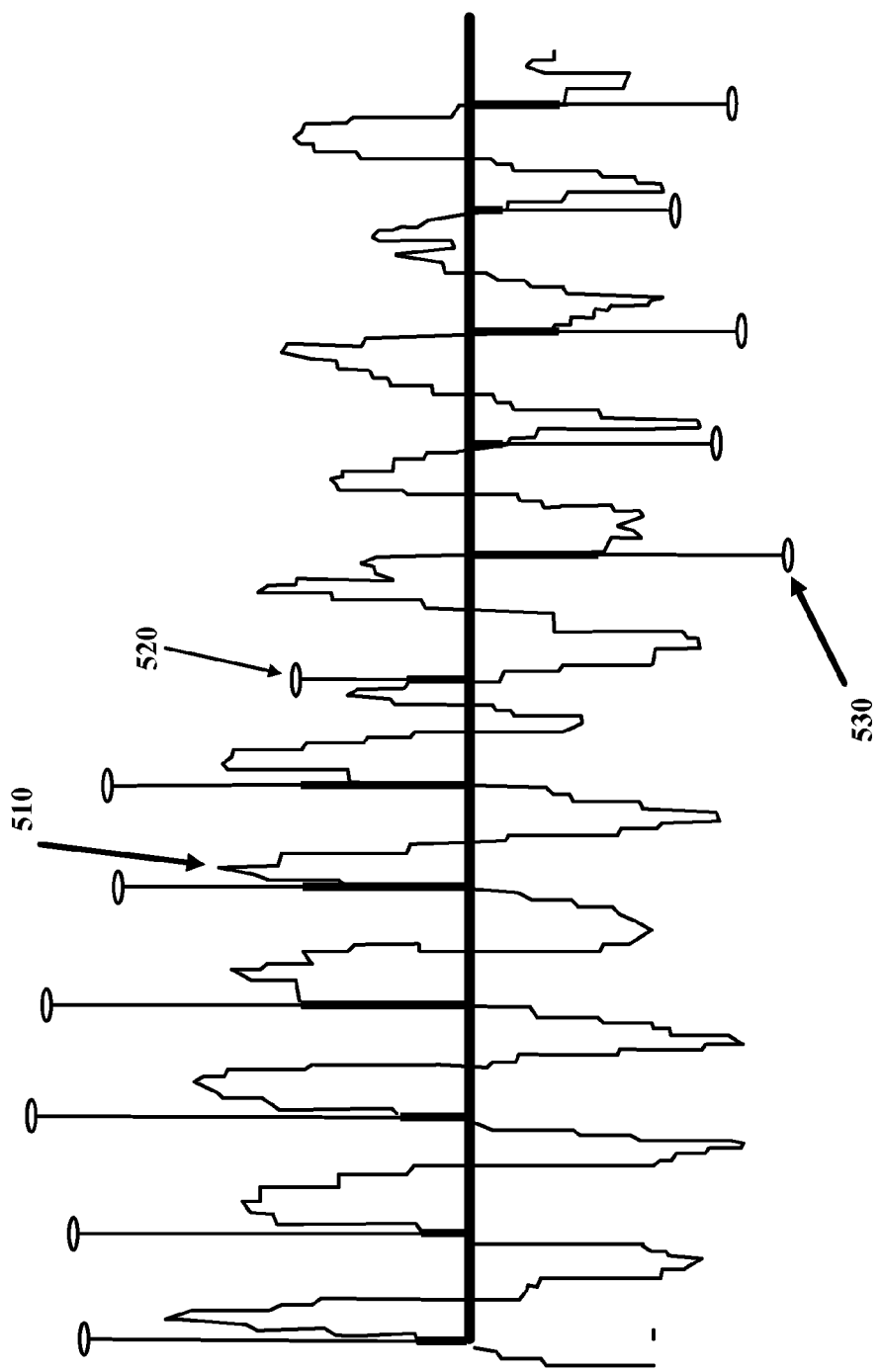
FIG. 5 is a graph illustrating one embodiment of an algorithm used in correcting a phase transition imperfection.

FIG. 5 is a graph illustrating one embodiment of an algorithm used in correcting a phase transition imperfection. As described above, if the absolute value of the first scaled and integrated sample is less than the threshold, a phase transition imperfection may exist in a wobble signal 510. The phase transition imperfection may affect the integration of the first scaled wobble sample over the whole period; accordingly, integration of the first scaled wobble sample over a smaller period of the wobble clock may eliminate the phase transition imperfection. In one embodiment, half periods may be used by a half period integrator in integrating the first scaled wobble sample. A digital timing controller 240, as shown in FIGS. 2 and 4, may select which half period is to be used by implementing an algorithm.

To determine which half period to use in the integration, in one embodiment, the algorithm may compare two consecutive whole period integrated results, designated in this embodiment as I_A 520 and I_B 530, which occur at the first transition of a synchronization mark. A synchronization mark may be a sequence of bits representing a sequence of wobble signal samples, with one bit representing one wobble sample. In one embodiment, a sequence of six wobbles with values of +1, followed by four wobbles with values of −1, and six wobbles with values of +1 may indicate the detection of a synchronization mark (i.e., a 6-4-6 synchronization mark). The 6-4-6 pattern is merely an example; numerous types of synchronization marks employing different patterns of +1 wobble values and −1 wobble values will be apparent to those skilled in the art.

In the case of the exemplary 6-4-6 synchronization mark, the first transition of the synchronization mark may occur upon the transition of the last of the first six +1 values to the first of the four wobbles having a −1 value. At this point, whole period integrated results I_A 520 (representative of the last of the first six +1 wobble values) and I_B 530 (representative of the first of the four −1 wobble values) may be compared. If the difference in the absolute value of I_A 520 and the absolute value of I_B 530 is greater than the negative of the programmable threshold value (i.e. abs (I_A)−abs (I_B) >−threshold), then the digital timing controller 240 may integrate the first scaled sample over the first half period of the wobble clock signal. If the difference in the absolute value of I_A 520 and the absolute value of I_B 530 is greater than the programmable threshold (i.e. abs (I_A)−abs (I_B)>threshold), then the second half period of the wobble clock signal may be used to integrate the first scaled sample. If neither comparison is true, then the half period integrator 420 may not be used because no phase transition imperfection exists. Other algorithms also may be used in place of the above-described algorithm in determining which half period is used to integrate the first scaled sample.

Figure 6:
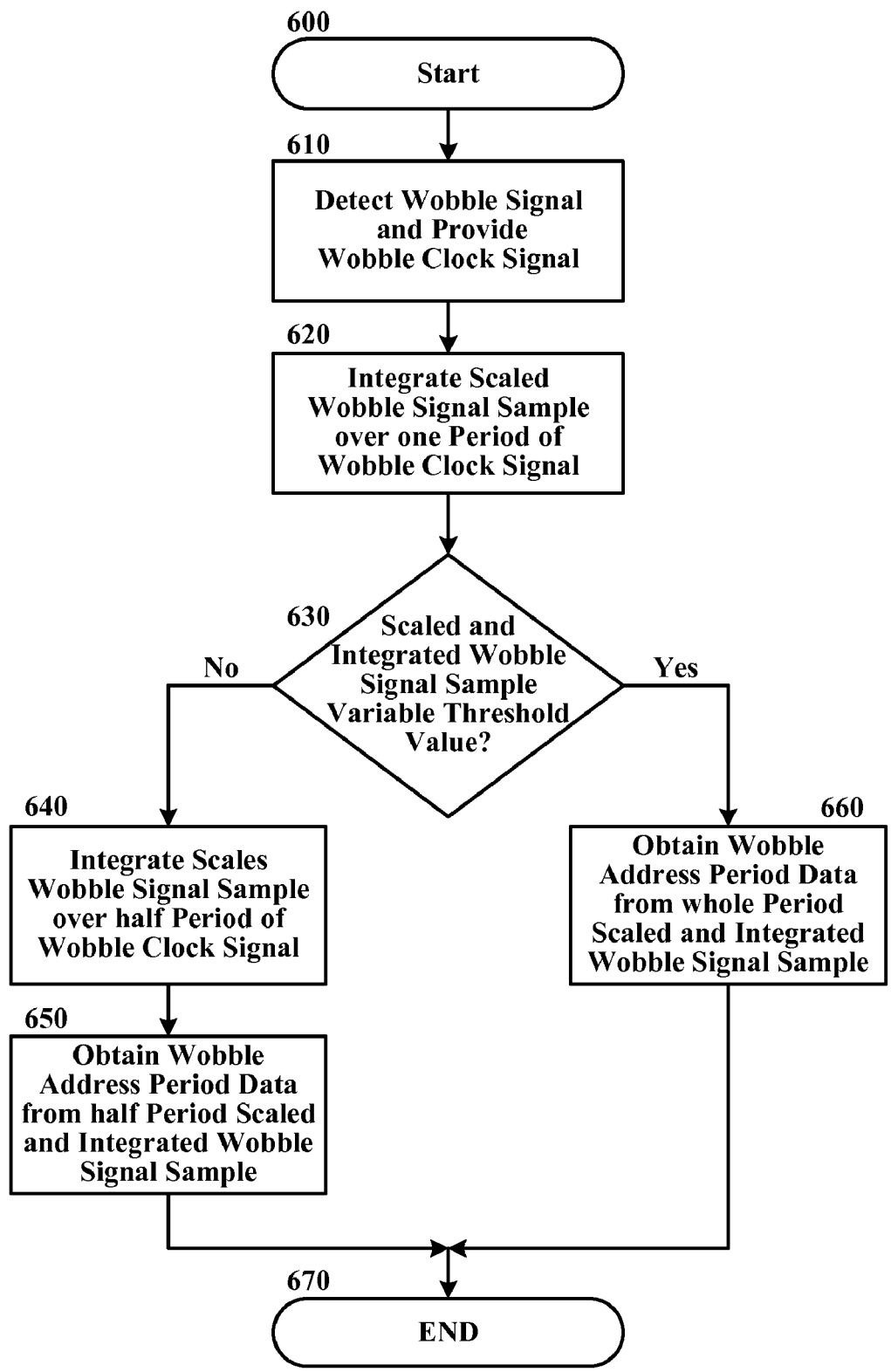
FIG. 6 is a flowchart illustrating one embodiment of the inventive method for correcting a wobble signal phase transition imperfection.

FIG. 6 illustrates one embodiment of the inventive method for correcting a wobble signal phase transition imperfection. In block 610, a wobble detector may detect a wobble signal from an optical recording medium. A wobble clock signal may be provided or generated based on the detected wobble signal. In block 620, a detected wobble signal may be converted into wobble signal samples. The wobble signal sample may be scaled by a first scaling factor, such as a cosine function (an in-phase component). The scaled wobble signal sample may be integrated over one period of the wobble clock signal. In decision block 630, the scaled and integrated wobble signal sample may be compared to a variable threshold value. A scaled and integrated wobble signal sample having a value greater than the variable threshold value may indicate that no phase imperfection exists in the wobble signal. As a result, in block 660, the scaled and integrated wobble signal sample may be decoded to obtain wobble address period data. A scaled and integrated wobble signal sample having a value less than the variable threshold value may indicate that a phase imperfection may exist in the wobble signal. Generally, a phase imperfection may occur during the first half or the second half of the wobble clock signal period. In block 640, the scaled wobble signal sample may be integrated over a half period of the wobble clock signal. A controller, such as the digital timing controller 240 of FIG. 2, may determine whether to integrate the scaled wobble signal sample over the first half or the second half of the wobble clock signal period. The controller may use an algorithm, such as the algorithm embodiment of FIG. 5, to determine which half of the wobble clock signal period to use in integrating the scaled wobble clock signal. Subsequent to the integration of the scaled wobble signal sample over a half period of the wobble clock signal period, in block 650, the half period integrated and scaled wobble signal sample may be decoded to obtain wobble address period data.

Figure 7:
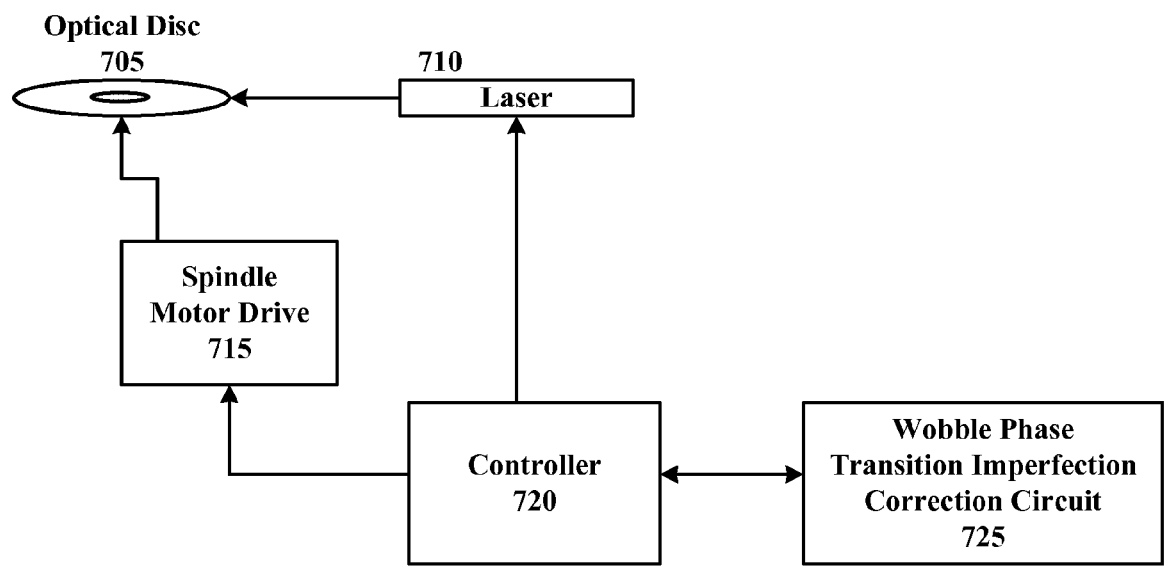
FIG. 7 is a diagram illustrating an embodiment of a portion of a multimedia recording system incorporating a wobble signal phase transition imperfection correction circuit.

FIG. 7 is a diagram of an embodiment of a portion of a multimedia recording system incorporating a wobble signal phase transition imperfection correction circuit. An optical disc 705, conforming to any standards which employs BPSK encoding, such as DVD, HD-DVD, or DVD+(R or RW), may spin at a predetermined speed. A spindle motor drive 715 may control how fast the disc spins. While the disc is spinning, an optical device (shown solely by way of example in FIG. 7 as a laser 710) may write data to the disc. The laser 710 and the spindle motor drive 715 may be controlled by a controller. The disc 705 may contain a wobble, which stores address or location data in the form of phase modulated data. A wobble signal may be read from the wobble as the disc spins. The wobble signal may help precisely rotate the disc during the recording process. A timing signal also may be generated from the wobble signal to aid in the recording of data on the disc. However, as described above, imperfect phase transitions between phases representing 0 bits and phases representing 1 bits may cause the wobble signal to be read imperfectly. The wobble signal phase transition imperfection correction circuit 725 may be electrically coupled to the controller 720 and may correct such phase transition imperfections as they are detected. The wobble signal phase transition imperfection correction circuit 725 may correct these imperfections using the embodiments described above.

Embodiments of the invention described above may be used in or incorporated into fields and devices employing binary phase shift keying (BPSK), including, but not limited to, communications systems and wireless protocols, and optical discs, including various forms of video discs such as DVDs, HD-DVDs, and DVD+(R or RW), where it is desirable to correct timing problems. For example, embodiments of the invention described above may be used to correct timing problems in communications systems and wireless protocols which employ BPSK and suffer from timing problems associated with BPSK. Embodiments of the invention described above also may be used in various optical and video disc formats, such as HD DVD, DVD+R, and DVD+RW, to correct timing problems associated with the use of BPSK to encode data.

In addition to these exemplary embodiments, those skilled in the art will recognize that numerous applications of the above-described embodiments are possible, and that disclosure of the just-described applications does not limit the invention to these applications. Rather, all suitable applications fall within the scope of the invention. Therefore, the foregoing is illustrative only of the principles of the invention. Further, those skilled in the art will recognize that numerous modifications and changes are possible, the disclosure of the just-described embodiments does not limit the invention to the exact construction and operation shown, and accordingly, all suitable modifications and equivalents fall within the scope of the invention.

What is claimed is:

1. A circuit, comprising:
    a wobble detector to detect a wobble signal and to provide a wobble clock signal;
    a wobble signal phase imperfection detector, responsive to the wobble signal and the wobble clock signal, to detect and correct a phase transition imperfection in the wobble signal, said wobble signal phase imperfection detector comprising:
    a comparator to compare a variable threshold value to an absolute value of a first scaled wobble signal sample integrated over substantially one period of the wobble clock signal;
    an integrator to integrate the first scaled wobble signal sample over substantially a half-period portion of the wobble clock signal, wherein said substantially a half-period portion of the wobble clock signal is substantially a first half period portion of the wobble clock signal or substantially a second half period portion of the wobble clock signal, based on a phase transition comparison of a difference between absolute values of first and second consecutive integrated and scaled wobble signal samples and the variable threshold value; and
    a selector, responsive to the comparison, to select as an output either the first scaled wobble signal sample integrated over the substantially one period of the wobble clock signal or the half period scaled and integrated wobble signal sample.

2. The circuit of claim 1, wherein said wobble detector comprises:
    a controller to generate the wobble clock signal;
    a first branch comprising a first multiplier to generate a first scaled wobble signal, and a first integrator to integrate the first scaled wobble signal over the substantially one period of the wobble clock signal;
    a second branch comprising a second multiplier to generate a second scaled wobble signal, and a second integrator to integrate the second scaled wobble signal over the substantially one period of the wobble clock signal;
    a phase detector, responsive to the first and second scaled and integrated wobble signals, to generate phase information as a timing error signal; and
    a timing loop filter, responsive to the phase information, to filter the timing error signal.

3. The circuit of claim 2, wherein said wobble detector further comprises:
an analog-to-digital converter, responsive to the filtered timing error signal, to convert the wobble signal into the wobble signal sample;
wherein said controller comprises a digital timing controller;
wherein said first multiplier multiplies the wobble signal sample by a first scaled factor to generate the first scaled wobble signal;
wherein said second multiplier multiplies the wobble signal sample by a second scaled factor to generate the second scaled wobble signal; and
wherein said phase detector generates phase information of the wobble signal sample as the timing error signal.

4. The circuit of claim 3, wherein the first scaled factor is a cosine function and the second scaled factor is a sine function.

5. The circuit of claim 1, wherein said integrator integrates the first scaled wobble signal sample over the first half period portion of the wobble clock signal if the difference of the absolute values of the first and the second consecutive integrated and scaled wobble signal samples is greater than the additive inverse of the variable threshold value, and wherein said integrator integrates the first scaled wobble signal sample over said second half period portion of said wobble clock signal if the difference of the absolute values of the first and the second consecutive integrated and scaled wobble signal samples is greater than the variable threshold value.

6. The circuit of claim 5, wherein said selector selects as the output the first scaled and integrated wobble signal sample if the absolute value of the first scaled and integrated wobble signal sample is greater than the variable threshold value, and said selector selects as the output the half period scaled and integrated wobble signal sample if the absolute value of the first scaled and integrated wobble signal sample is less than the variable threshold value.

7. The circuit of claim 1, further comprising an output circuit to provide wobble address period data in response to the output of said selector.

8. A circuit, comprising:
a wobble detecting means to detect a wobble signal and to provide a wobble clock signal;
a wobble signal phase imperfection detecting means, responsive to the wobble signal and the wobble clock signal, to detect and correct a phase transition imperfection in the wobble signal, said wobble signal phase imperfection detecting means comprising:
means for comparing a variable threshold value to an absolute value of a first scaled wobble signal sample integrated over substantially one period of the wobble clock signal;
means for integrating the first scaled wobble signal sample over substantially a half-period portion of the wobble clock signal, wherein said substantially a half-period portion of the wobble clock signal is substantially a first half period portion of the wobble clock signal or substantially a second half period portion of the wobble clock signal, based on a phase transition comparison of a difference between absolute values of first and second consecutive integrated and scaled wobble signal samples and the variable threshold value; and
means, responsive to the comparison, for selecting as an output either the first scaled wobble signal sample integrated over the substantially one period of the wobble clock signal or the half period scaled and integrated wobble signal sample.

9. The circuit of claim 8, wherein said wobble detecting means comprises:
a controller means to generate the wobble clock signal;
a first branch comprising a first multiplying means to generate a first scaled wobble signal, and a first means for integrating the first scaled wobble signal over the substantially one period of the wobble clock signal;
a second branch comprising a second multiplying means to generate a second scaled wobble signal, and a second means for integrating the second scaled wobble signal over the substantially one period of the wobble clock signal;
a phase detecting means, responsive to the first and second scaled and integrated wobble signals, to generate phase information as a timing error signal; and
a timing loop filtering means, responsive to the phase information, to filter the timing error signal.

10. The circuit of claim 9, wherein said wobble detecting means further comprises:
an analog-to-digital converting means, responsive to the filtered timing error signal, to convert the wobble signal into the wobble signal sample;
wherein said controller means comprises a digital timing controller;
wherein said first multiplying means multiplies the wobble signal sample by a first scaled factor to generate the first scaled wobble signal;
wherein said second multiplying means multiplies the wobble signal sample by a second scaled factor to generate the second scaled wobble signal; and
wherein said phase detecting means generates phase information of the wobble signal sample as the timing error signal.

11. The circuit of claim 10, wherein the first scaled factor is a cosine function and the second scaled factor is a sine function.

12. The circuit of claim 8, wherein said means for integrating integrates the first scaled wobble signal sample over the first half period portion of the wobble clock signal if the difference of the absolute values of the first and the second consecutive integrated and scaled wobble signal samples is greater than the additive inverse of the variable threshold value, and wherein said means for integrating integrates the first scaled wobble signal sample over the second half period portion of the wobble clock signal if the difference of the absolute values of the first and the second consecutive integrated and scaled wobble signal samples is greater than the variable threshold value.

13. The circuit of claim 12, wherein said means for selecting selects as the output the first scaled and integrated wobble signal sample if the absolute value of the first scaled and integrated wobble signal sample is greater than the variable threshold value, and said means for selecting selects as the output the half period scaled and integrated wobble signal sample if the absolute value of the first scaled and integrated wobble signal sample is less than the variable threshold value.

14. The circuit of claim 8, further comprising means for outputting wobble address period data in response to the output of said means for selecting.

15. A method, comprising:
detecting a wobble signal; generating a wobble clock signal;
integrating a scaled wobble signal sample over substantially one period of the wobble clock signal;
comparing the scaled and integrated wobble signal sample with a variable threshold value;

if the scaled and integrated wobble signal sample is greater than the variable threshold value, decoding the scaled and integrated wobble signal sample to obtain wobble address period data; and if the scaled and integrated wobble signal sample is less than the variable threshold value, integrating the scaled wobble signal sample over a substantially half-period of the wobble clock signal, and decoding the scaled and half-period integrated wobble signal sample to obtain wobble address period data, wherein said integrating the scaled wobble signal sample over a substantially half-period of the wobble clock signal integrates the scaled wobble signal sample over a first half-period of the wobble clock signal or a second half-period of the wobble clock signal based on a phase transition comparison of a difference between absolute values of first and second consecutive integrated and scaled wobble signal samples and the variable threshold value.

16. The method of claim 15, wherein said integrating the scaled wobble signal sample over a substantially half-period of the wobble clock signal integrates the scaled wobble signal sample over the first half-period of the wobble clock signal if the difference of the absolute values of the first and the second consecutive integrated and scaled wobble signal samples is greater than the additive inverse of the variable threshold value, and wherein said integrating the scaled wobble signal sample over a substantially half-period of the wobble clock signal integrates the scaled wobble signal sample over the second half-period of the wobble clock signal if the difference of the absolute values of the first and the second consecutive integrated and scaled wobble signal samples is greater than the variable threshold value.

17. A multimedia recording system, comprising:
an optical device to record data on a surface of an optical recording medium;
a motor spindle to spin the optical recording medium at a predetermined speed;
a controller, electrically connected to the motor spindle and the optical device, to control the predetermined speed of the motor spindle and operation of the optical device; and
the circuit according to claim 1, electrically connected to the controller, to correct phase imperfections in a wobble signal detected by the optical device.

18. The multimedia recording system of claim 17, wherein said wobble detector comprises:
a controller to generate the wobble clock signal;
a first branch comprising a first multiplier to generate a first scaled wobble signal, and a first integrator to integrate the first scaled wobble signal over the substantially one period of the wobble clock signal;
a second branch comprising a second multiplier to generate a second scaled wobble signal, and a second integrator to integrate the second scaled wobble signal over the substantially one period of the wobble clock signal;
a phase detector, responsive to the first and second scaled and integrated wobble signals, to generate phase information as a timing error signal; and
a timing loop filter, responsive to the phase information, to filter the timing error signal.

19. The multimedia recording system of claim 18, wherein said wobble detector further comprises:
an analog-to-digital converter, responsive to the filtered timing error signal, to convert the wobble signal into the wobble signal sample;
wherein said controller comprises a digital timing controller;
wherein said first multiplier multiplies the wobble signal sample by a first scaled factor to generate the first scaled wobble signal;
wherein said second multiplier multiplies the wobble signal sample by a second scaled factor to generate the second scaled wobble signal; and
wherein said phase detector generates phase information of the wobble signal sample as the timing error signal.

20. The multimedia recording system of claim 19, wherein the first scaled factor is a cosine function and the second scaled factor is a sine function.

21. The multimedia recording system of claim 17, wherein said integrator integrates the first scaled wobble signal sample over the first half period portion of the wobble clock signal if the difference of the absolute value of the first and the second consecutive integrated and scaled wobble signal samples is greater than the additive inverse of the variable threshold value, and wherein said integrator integrates the first scaled wobble signal sample over said second half period portion of said wobble clock signal if the difference of the absolute value of the first and the second consecutive integrated and scaled wobble signal samples is greater than the variable threshold value.

22. The multimedia recording system of claim 21 wherein said selector selects as the output the first scaled and integrated wobble signal sample if the absolute value of the first scaled and integrated wobble signal sample is greater than the variable threshold value, and said selector selects as the output the half period scaled and integrated wobble signal sample if the absolute value of the first scaled and integrated wobble signal sample is less than the variable threshold value.

23. The multimedia recording system of claim 17, further comprising an output circuit to provide wobble address period data in response to the output of said selector.

* * * * *